Patented June 7, 1949

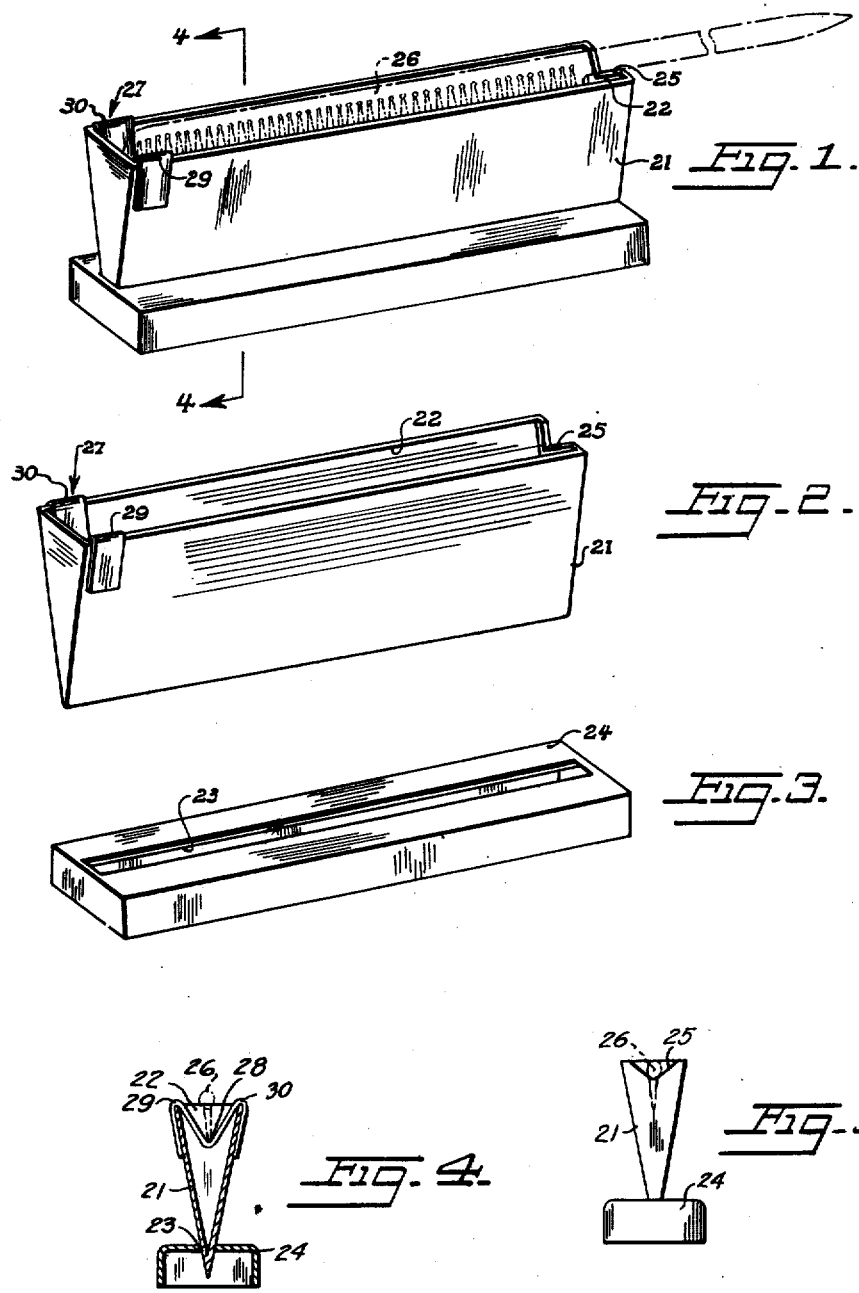

2,472,700

UNITED STATES PATENT OFFICE 2,472,700

CONTAINER FOR A COMB

Rudolf Gingold, New York, N. Y.

Application December 11, 1946, Serial No. 715,385

2 Claims. (Cl. 132—9)

This invention relates to a container adapted to be disposed on a flat surface to receive a comb.

It is an object of the present invention to provide a container for a comb which will keep dust from gathering upon it and which will be easily accessible to the user at all times with the comb removable from the container or wherein the comb itself may contain the cover portion.

It is another object of the present invention to provide a comb container which can be rested upon a flat surface in place to receive a comb and adapted to contain a liquid for use upon the hair.

It is another object of the present invention to provide a container adapted to be rested upon a flat surface and contain a liquid, and wherein there is provided a bracket to retain the comb raised above the liquid at times when it is desired that the comb be left to dry.

According to the invention, there is provided a container adapted to be rested upon a flat surface. The container has a trough-like opening into which the teeth of the comb are extended. This opening may contain liquid, if desired, for use on the hair. The casing providing the opening may be of V-shaped cross section and is provided with a base into which the bottom of the trough casing extends. Within the trough, there is located at one end a transverse piece on which the forward end of the comb may be rested to keep the comb out of the liquid. The rear end of trough has a notch through which the handle portion may extend.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

Fig. 1 is a perspective view of one form of the invention showing a V-shaped trough rested in a slot in a base and a comb resting upon a transverse piece at one end of the trough and its handle in a notch at the other end of the trough.

Fig. 2 is a perspective view of the trough alone.

Fig. 3 is a perspective view of the base alone.

Fig. 4 is a transverse vertical cross sectional view taken on line 4—4 of Fig. 1, looking in the direction of the arrows thereof.

Fig. 5 is an end elevational view of the container as viewed upon the V-notch or handle end of the same.

The comb container according to the present invention, includes a V-shaped trough 21 having an open top 22 and a closed bottom in order to contain a liquid. The bottom of the trough 21 is rested in an elongated slot 23 of a base 24 whereby the trough may be supported in a vertical position on a flat surface. In one end of the trough there is a V-shaped notch 25 in which the handle of a comb 26 may be rested. The forward end of the comb may be either lowered into the liquid contained in the trough 21 or supported upon a transverse piece 27 in the opposite end of the trough. This transverse piece is folded in the middle as indicated at 28 to provide a V-shaped intermediate portion corresponding to the V-shaped notch 25 into which the forward end of the comb may be inserted. The transverse piece 27 is further folded as indicated at 29 and 30 so that portions extend down over the exterior of the trough 21 for attachment thereto as by gluing. At times when it is not desired that the comb be dipped into the liquid and when it is desired that the comb be dried, the end thereof is disposed upon the transverse piece 27.

It should be apparent that there has been provided a comb container which may be rested upon a flat surface and contain a liquid and the comb either within the liquid or supported at an elevation above the liquid with its end on a transverse piece.

While I have illustrated and described the preferred embodiment of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A container for a comb, comprising a trough of V-shaped section having an opening adapted to receive a comb, and a base having an elongated slot for receiving the bottom of the trough to support the trough in an upright manner upon a flat surface, one end of the V-shaped container having a notch adapted to receive the handle of the comb, and a transverse piece in the opposite end of the trough adapted to receive the forward end of the comb to retain the same above a liquid which may be disposed within the trough.

2. A container of the type described for supporting a comb having a handle, comprising a flat elongated base formed with a V-shaped slot extended substantially the length thereof, an elongated V-shaped trough for containing a liquid having its bottom rested in said V-shaped slot, one end of said trough being formed with a notch for receiving the handle of the comb, and an elongated strip of material folded in the middle to provide a V-shaped portion for supporting the other end of the comb and having its end portions bent over the top edges of the trough supporting the strip of material from the top edges of said trough.

RUDOLF GINGOLD.

REFERENCES CITED

The following references are of record in the file of this patent:

UNITED STATES PATENTS

| Number | Name | Date |
|---|---|---|
| 2,041,960 | Rioux | May 26, 1936 |
| 2,420,576 | Tupper | May 13, 1947 |

FOREIGN PATENTS

| Number | Country | Date |
|---|---|---|
| 405,872 | Great Britain | Feb. 15, 1934 |
| 497,044 | Great Britain | Dec. 12, 1918 |